United States Patent [19]
Felten et al.

[11] 3,765,947

[45] Oct. 16, 1973

[54] METHOD OF MAKING FUEL CELL ELECTRODE

[75] Inventors: Edward J. Felten, Cheshire; Kipp G. Pearson, South Windsor, both of Conn.

[73] Assignee: United Aircraft Corporation, East Hartford, Conn.

[22] Filed: Mar. 13, 1972

[21] Appl. No.: 234,350

Related U.S. Application Data

[63] Continuation-in-part of Ser. No. 90,812, Nov. 18, 1970, abandoned.

[52] U.S. Cl. .......................................... 136/120 FC
[51] Int. Cl. ............................................. H01m 13/00
[58] Field of Search ................... 136/120 FC, 86 D, 136/86 DD, 120; 252/472–474

[56] References Cited
UNITED STATES PATENTS

| | | | |
|---|---|---|---|
| 3,332,806 | 7/1967 | Teller et al. | 136/86 DD |
| 3,357,863 | 12/1967 | Ziering | 136/120 FC X |
| 3,393,100 | 7/1968 | Niedrach | 136/120 FC |
| 3,455,845 | 7/1969 | Wicke et al. | 252/474 |
| 3,506,494 | 4/1970 | Adlhart | 136/120 FC |
| 3,615,840 | 10/1971 | Wolfe, Jr. | 136/86 D |

*Primary Examiner*—Anthony Skapars
*Attorney*—Richard N. James

[57] ABSTRACT

A fuel cell electrode embodying an anodic catalyst including platinum and rhodium oxides and an oxide selected from the oxides of nickel, cobalt, iron and copper together with a component convertible to tungsten oxide is manufactured to provide high electrical performance at very low noble metal loadings.

3 Claims, No Drawings

METHOD OF MAKING FUEL CELL ELECTRODE

This application is a continuation-in-part of copending application Ser. No. 90,812, filed Nov. 18, 1970

BACKGROUND OF THE INVENTION

The present invention relates to the production of a fuel cell electrode incorporating a novel catalyst suitable for use in typical fuel cells, such as hydrogen-oxygen or hydrogen-air fuel cells. More particularly, it relates to the production of a novel catalytic electrode comprising platinum oxide or a mixture of platinum and rhodium oxides and an oxide of nickel, cobalt, iron or copper admixed with a component convertible to tungsten oxide. The electrode can be used in fuel cells which employ a hydrogen fuel that is contaminated with carbon monoxide.

A fuel cell is a device which converts the energy of a chemical reaction between a fuel and oxidant directly into low voltage, direct current electricity. In obtaining an efficient fuel cell, the problems encountered are essentially problems of chemical kinetics. It is necessary that the reaction between the fuel and oxidant occurs in such manner that the amount of energy degraded into heat is as small as possible. At the same time, the reaction rate of the cell must be high enough to produce economically sufficient current from a cell of practical size.

A typical fuel cell comprises a fuel electrode or anode, an oxidant electrode or cathode, an electrolyte positioned between the electrodes and means to introduce fuel and oxidant to their respective electrodes. In operation, air or oxygen is forced through the cathode where the oxidant reacts at a catalytic surface with the electrolyte within the pores of the electrode. Hydroxyl ions and either free oxygen or water are formed, with the hydroxyl ions passing through the pores of the electrode into the electrolyte for transference to the anode. At the anode, fuel enters and impinges on the electrode where a process of adsorption, reaction and desorption occurs. In an acid system, the fuel molecules are dissociated, oxidized and the positive part of the molecule migrates to the cathode where it combines with the negative moiety of the oxidant, forming a neutral product. The electrical charges are drawn from the electrode or a closely spaced current collector to an external circuit.

Fuel cells are particularly attractive commercially due to their potential performance characteristics. Cells having an efficiency of up to about 90 percent have been constructed, which is far superior to the efficiency of a gas turbine, which has a theoretical maximum efficiency of only about 30 percent as set forth in Carnot's Heat Law. Since a fuel cell is not governed by heat considerations, the theoretical efficiencies are not so limited.

In an effort to obtain a fuel cell which is practical on a commercial scale, a great deal of research has been carried out in an effort to find improved electrodes. Thus, in the prior art, fuel cell electrodes have been constructed of nickel, and other electrodes suggested of platinum or rhodium. Such electrodes have been found to possess many desirable characteristics in a fuel cell. It has now been found that outstanding characteristics are obtained when mixtures of noble metal oxides and certain oxides contributing bulk together with a precipitated component convertible to tungsten oxide, are employed in fuel cell electrodes. Such electrodes, while providing excellent electrochemical performance characteristics, are substantially unaffected by the corrosive influences of a fuel cell and have an extremely high surface area which extends the catalyst over large surface areas.

Fuel gases other than purified hydrogen have been used with fuel cells. One of the more common is the product obtained by passing steam-reformed natural gas (RNG) through a shift converter. The gas is composed mainly of hydrogen and carbon dioxide, but also contains a small concentration of carbon monoxide. When this gas is used at the anode of an acid fuel cell in which platinum is the catalyst, the carbon monoxide rapidly poisons the platinum, thereby seriously reducing the performance level of the electrode. Ideally, a catalyst for use in an acid fuel cell using reformed gas must have a tolerance for carbon monoxide, a hydrogen activity equivalent to platinum black and be capable of long time operation using the smallest weight possible. Poisoning of the platinum by carbon monoxide becomes less noticeable as the temperature is raised. But the use of elevated temperatures raises the rate of corrosion and markedly reduces the life of the cell. Methods are available to remove carbon monoxide from RNG, by methanation or preferred oxidation, for example, but these adaptations increase both the cost and complexity of the system.

An anode catalyst which will operate efficiently at 120°–135°C. on unpurified RNG offers considerable advantages. The choice of this particular temperature range permits the use of waste heat from the cell to raise steam for the reforming process while still maintaining corrosion at an acceptably low level. The present invention incorporates an anode catalyst which exhibits good tolerance to carbon monoxide and resistance to corrosion in 85 percent phosphoric acid.

Binary alloys of platinum and nickel (and ternary alloys with rhodium) are known to be quite resistant to carbon monoxide poisoning. Some of these alloys may also have tungsten oxide incorporated in them. In an article by McKee and Pak, J. Electrochemical Society: Electrochemical Technology, Vol. 116, No. 4, April 1969, pages 516–520, an alloy composition of nickel and copper with platinum is disclosed. In the patent to Ziering, U.S. Pat. No. 3,357,863, a polycomponent catalyst mixture of rhodium, platinum and tungsten oxide is disclosed.

SUMMARY OF THE INVENTION

The basic objective of the present invention is to provide a novel fuel cell electrode and particularly, one incorporating an anodic catalyst tolerant of the usual fuel cell contaminants, displaying a very low noble metal loading which is the principal factor determinative of electrode cost, but with performance equivalent to electrodes characterized by much higher precious metal contents.

A novel method of manufacture for such electrodes, and the catalyst therefor, has been discovered which accomplishes the above objective. The precious metal loading levels achieved herein are in the order of ½ – 4 $mg/cm^2$ or less of precious metal as compared to conventional loadings of typically 25–30 $mg/cm^2$ in electrodes exhibiting equivalent performance.

In summary, the present process contemplates:
forming a first mixture of fine powders comprising a noble metal oxide or oxides and at least one oxide selected from the oxides of nickel, cobalt, iron and copper;

forming a catalyst comprising the first mixture plus tungstic acid;

forming another mixture comprising the catalyst plus a suitable bonding agent such as polytetrafluoroethylene; and applying the latter mixture to a suitable conductive substrate and bonding the same thereto to form a gas porous electrode characterized by electrical conductivity between the particles of the catalyst and between said particles and the conductive substrate.

In a reducing environment, as in operation of the fuel cell, the precious metal oxides are reduced to the elemental metal or metals, sometimes with alloying, while the oxides of nickel, cobalt, iron and copper are retained as the oxide.

DESCRIPTION OF THE PREFERRED EMBODIMENT

Due to the nature of the composition produced in this invention, the catalyst has an extremely high surface area, is quite tolerant of carbon monoxide (which frequently poisons many similar fuel cell catalysts) and provides a high rate of reaction. The catalyst as manufactured consists of platinum oxide or, preferably, a mixture of platinum and rhodium oxides together with at least one oxide selected from the oxides of nickel, cobalt, iron and copper and a tungsten compound convertible to tungsten oxide, usually tungstic acid. Due to the techniques of preparation, substantially all of the oxides of nickel, copper, iron or cobalt are retained as oxides in the catalyst while the platinum and rhodium from which the catalyst is derived, although in oxide form as applied, are converted into the metal during electrode operation.

One portion of the catalyst according to the present invention is a noble metal oxide or oxides together with an oxide of nickel, cobalt, iron and/or copper (0.5 to 50 w/o). The other portion of the catalyst is an ingredient, such as tungstic acid, convertible to tungsten oxide (1 to 50 w/o of the catalyst). The catalyst is quite finely divided and at least about 75 percent of the particles are under $20\mu$. As used herein, w/o will be understood to refer to weight percent.

In the catalyst which we have described above, rhodium is typically added to increase the surface area. In the following Table I, various weights of rhodium are added to form the catalyst. As shown, as the amount of rhodium is increased, the surface area is increased. It is to be remembered, however, that rhodium is quite expensive and its quantity should be kept to a minimum consistent with the desired surface area. Although good performance has been obtained with as little as 1 w/o rhodium, the optimum amount seems to fall between 20 and 35 w/o rhodium together with about 25–50 w/o platinum, based on the total weight of the catalyst.

TABLE I

| Rhodium w/o | Surface Area m²/gm |
|---|---|
| 5 | 167 |
| 10 | 190 |
| 15 | 230 |
| 20 | 255 |
| 25 | 285 |
| 30 | 315 |
| 35 | 340 |

As mentioned, the catalyst also contains, in addition to platinum and rhodium, substantial quantities of an oxide of nickel, cobalt, iron or copper. The nickel oxide reduces the quantity of catalyst which has to be placed upon the electrode in order to achieve a desired rate of reaction. In other words, the nickel, which is provided as the oxide during manufacture and retained as the oxide during operation, adds bulk to the catalyst and can help reduce the quantities of rhodium and platinum, thereby lowering the cost while still retaining catalytic effectiveness. Because of the increase in bulk, fuel cell electrodes of low loadings (½–4 mg/cm²) of noble metal, particularly a platinum equivalent, are easily made, while in the absence of nickel, loadings as low as 4 mg/cm² are attained, if at all, only with difficulty. In addition to providing these benefits, as will be seen in Table II, the nickel can be included, in quantities of 0.5 to 50 w/o, to increase the tolerance of the catalyst to carbon monoxide.

TABLE II

| weight %: | | | | Millivolts at |
|---|---|---|---|---|
| Ni | Pt | Rh | WO₃ | 500 milliamperes (E*) |
| 0 | 40 | 40 | 20 | 60 |
| 10 | 35 | 35 | 20 | 58 |
| 25 | 50 | 5 | 20 | 128 |
| 39 | 40 | 1 | 20 | 200 |

In preparing the catalysts according to the preferred method, predetermined quantities of chloroplatinic acid, rhodium trichloride and nickel nitrate are individually dissolved in water. The quantities used are those which are the equivalent of the desired weights in the catalyst and within the ranges stated. Other water soluble salts of the metals, such as their chlorides, can be used. The solutions are then mixed and poured over sodium nitrate which is preferably in great excess and generally greater than ten times the combined weight of the platinum and rhodium salts. The excess water is evaporated in an oven at 110°C. and a dry cake is produced. The cake is then broken up and the mixture is transferred to a furnace to be heated for four hours at 400°C. The cake becomes molten at these temperatures and fuses into a glassy-like melt which is then crushed and leached in a large volume of water. In the fusion, the various salts are converted into the oxides, that is platinum oxide, rhodium oxide and nickel oxide. These oxides are insoluble in water while sodium chloride which is produced dissolves and the leaching step removes it from the mixture.

A predetermined amount of sodium tungstate is dissolved in water and the solution is thoroughly mixed with the slurry of metal oxides. A large excess of a mineral acid, usually HNO₃, is mixed with the slurry and a precipitate of tungstic acid immediately forms together with soluble sodium nitrate. After standing for two hours, the acidified slurry is diluted to a large volume and the solids are left to settle out. The liquid is decanted and the solids are washed until they are free of acid.

The oxides may then be mixed in a conventional aqueous dispersion of polytetrafluoroethylene or other suitable waterproofing binder and joined into an electrode supported upon a carbon paper or other conductive substrate in the conventional manner. As has been noted, in operation of the electrode the reduction of the oxides of platinum and rhodium to the metal is substantially complete although some minor or trace amounts of these oxides may remain unreduced. The nickel oxide remains unreduced.

A catalyst (Pt:Rh:Ni:WO$_3$::35:35:10:20) was successfully tested in an 85 w/o H$_3$PO$_4$ cell at 135°C. with an average catalyst loading or weight of 3.6 mg/cm$^2$ noble metal and a 10 w/o of the catalyst in a polytetrafluoroethylene binder. A fuel of hydrogen and another of hydrogen plus 1.6% CO was used. In another test, the catalyst mentioned above was used in both the anode and the cathode. The cell was run to 2,500 hours and no substantial decay was seen in the anode where 3.9 mg/cm$^2$ noble metal was located. At the cathode, which had a loading of 4.7 mg/cm$^2$, the decay was only 0.03 mV/hour.

As ways to prepare the catalysts according to this invention, the following Examples are offered.

EXAMPLE I

The following salts were each dissolved in the smallest possible quantity of water:

17.50gm H$_2$PtCl$_6$ · xH$_2$O (40 w/o Pt) = 7.00gm Pt 35 w/o 17.50gm RhCl$_3$ · xH$_2$O (40 w/o Rh) = 7.00gm Rh 35 w/o 10.00gm Ni (NO$_3$)$_2$ · 6H$_2$O (20 w/o Ni) = 2.00gm Ni 10 w/o

These solutions were then mixed together and poured over 500gm of NaNO$_3$. The mixture was heated in a crucible at 110°C. for a sufficient time to remove the water, and then the cake was broken up, transferred to a furnace and heated to 400°C. for four hours. The melt was cooled, poured into a large volume of water and washed several times to form a slurry of oxides. At that time 5.70gm of Na$_2$WO$_4$ · 2H$_2$O (equivalent of 4gm WO$_3$ or 20 w/o) was dissolved in a minimal amount of water and the solution was poured into the slurry of oxides. About 150ml. of nitric acid, more than enough to precipitate all of the sodium tungstate as tungstic acid, was poured into the slurry.

EXAMPLE II

The following salts were each dissolved in the smallest possible quantity of water:

5.625g H$_2$PtCl$_6$ · xH$_2$O (40 w/o Pt) = 2.25 g Pt 1.250g Rh Cl$_3$ · xH$_2$O (40 w/o Rh) = 0.50J Rh 3.360g Cu Cl$_2$ · 2H$_2$O (37 w/o Cu) = 1.25g Cu

The solutions were mixed together and poured over 150gm of NaNO$_3$. After addition of the tungstic acid, these ingredients had a quantity of 45 w/o Pt, 10 w/o Rh, 25 w/o Cu and 20 w/o WO$_3$. The balance of the treatment was the same as described in Example I.

EXAMPLE III

The following salts were each dissolved in the smallest possible quantity of water:

18.75g H$_2$PtCl$_6$ · xH$_2$O (40 w/o Pt) = 7.50g Pt 1.875g Rh Cl$_3$ · xH$_2$O (40 w/o Rh) = 0.75g Rh 18.75g Ni(NO$_3$)$_2$ · 2H$_2$O (20 w/o Ni) = 3.75g Ni

The solutions were mixed together and poured over 450gm of NaNO$_3$. After addition of the tungstic acid, these ingredients had a quantity of 50 w/o Pt, 5 w/o Rh, 25 w/o Ni and 20 w/o WO$_3$. The balance of the treatment was the same as described in Example I.

EXAMPLE IV

The following salts were each dissolved in the smallest possible quantity of water:

12.50g H$_2$PtCl$_6$ · xH$_2$O (40 w/o Pt) = 5.00g Pt 12.50g Rh Cl$_3$ · xH$_2$O (40 w/o Rh) = 5.00g Rh 8.50g Ni(NO$_3$)$_2$ · 6H$_2$O (20 w/o Ni) = 1.70g Ni

The solutions were mixed together and poured over 400gm of NaNO$_3$. After addition of the tungstic acid, these ingredients had a quantity of 25 w/o Pt, 25 w/o Rh, 8.5 w/o Ni and 41.5 w/o WO$_3$. The balance of the treatment was the same as described in Example I.

EXAMPLE V

The following salts were each dissolved in the smallest possible quantity of water:

5.00g H$_2$PtCl$_6$ · xH$_2$O (40 w/o Pt) = 2.00g Pt 0.25g Rh Cl$_3$ · xH$_2$O (40 w/o Rh) = 0.10g Rh 9.50g Ni(NO$_3$)$_2$ · 6H$_2$O (20 w/o Ni) = 1.90g Ni

The solutions were mixed together and poured over 175g NaNO$_3$. After addition of the tungstic acid, these ingredients had a quantity of 40 w/o Pt, 2 w/o Rh, 38 w/o Ni and 20 w/o WO$_3$. The balance of the treatment was the same as described in Example I.

It is apparent that modifications and changes can be made within the spirit and scope of the present invention but it is our intention only to be limited by the scope of the appended claims.

We claim:

1. The method of making a fuel cell electrode which comprises:

forming a first mixture consisting essentially of at least one noble metal oxide selected from the group consisting of platinum oxide and mixtures of platinum and rhodium oxides and at least one other oxide selected from the group consisting of the oxides of nickel, cobalt, iron and copper;

forming a catalyst consisting essentially of the first mixture plus tungstic acid;

forming another mixture consisting essentially of the catalyst plus an inert fuel cell electrode bonding agent; and applying and bonding the latter mixture to an electrically conductive substrate forming a gas porous electrode, the electrode being characterized by substntial electrical contact between the particles of the catalyst and between the catalyst and the conductive substrate at a fuel cell loading of noble metal not exceeding about 4 mg/cm$^2$.

2. The method of making a fuel cell electrode which comprises:

forming a first mixture consisting essentially of platinum oxide and rhodium oxide, together with at least one other oxide selected from the group consisting of the oxides of nickel, cobalt, iron and copper;

forming a catalyst consisting essentially of, by weight, 50–99 percent of the first mixture plus about 1–50 percent of tungstic acid based on the total weight of the catalyst, the catalyst containing 1–50 percent platinum, 1–40 percent rhodium, 26–75 percent platinum plus rhodium, and 5–40 percent of at least one oxide selected from the group consisting of the oxides of nickel, cobalt, iron and copper, based on total catalyst weight;

forming another mixture consisting essentially of the catalyst plus about 10–40 weight percent hydrophobic binder based on catalyst weight; and bonding the latter mixture to an electrically conductive substrate forming a gas porous, liquid-impervious fuel cell electrode at a platinum/rhodium loading of about ½ – 4 mg/cm$^2$, the electrode being electrically conductive along the catalytic path.

3. The method according to claim 2 wherein:
the other oxide is nickel oxide.

* * * * *